H. J. BRENNECKE.
GOGGLE LENS CONNECTION.
APPLICATION FILED OCT. 28, 1914.
1,129,950.
Patented Mar. 2, 1915.
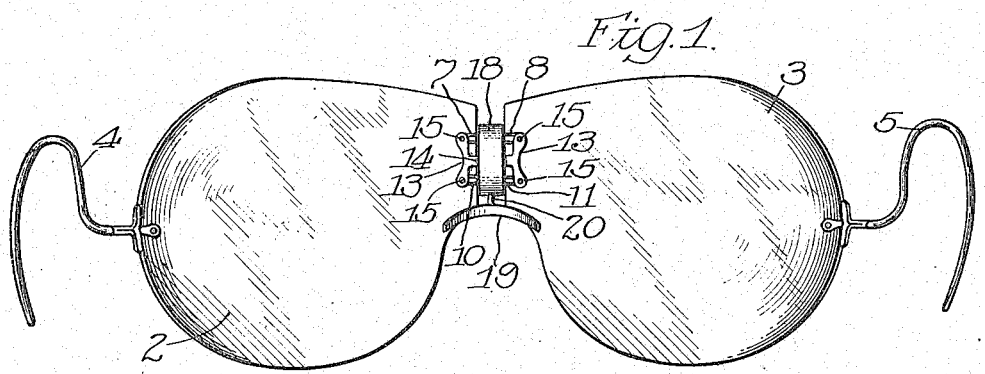
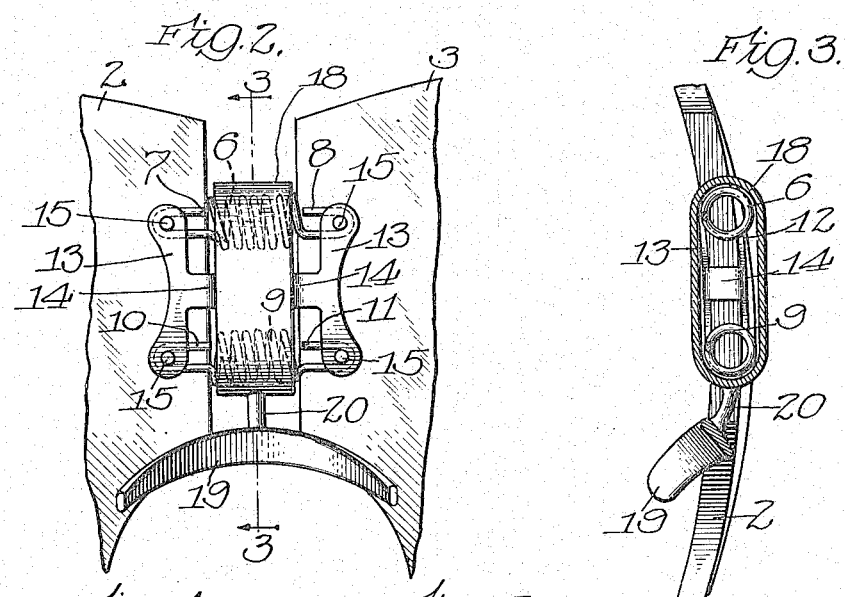
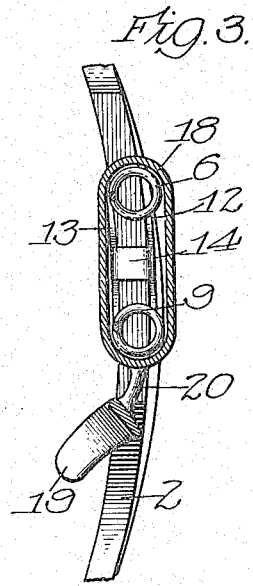
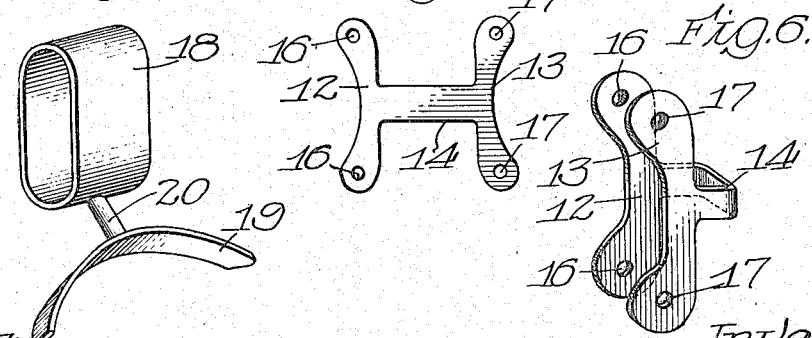
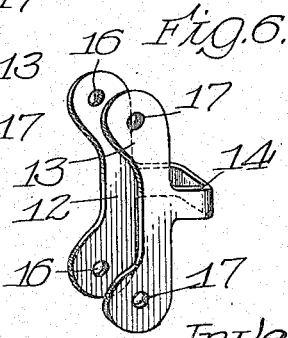
Witnesses:
Inventor:
Herman J. Brennecke

UNITED STATES PATENT OFFICE.

HERMAN J. BRENNECKE, OF CHICAGO, ILLINOIS.

GOGGLE-LENS CONNECTION.

1,129,950.  Specification of Letters Patent.  Patented Mar. 2, 1915.

Application filed October 28, 1914. Serial No. 869,009.

*To all whom it may concern:*

Be it known that I, HERMAN J. BRENNECKE, a citizen of the United States, residing in Chicago, in the county of Cook and State of Illinois, have invented certain new and useful Improvements in Goggle-Lens Connections, of which the following is a specification.

My invention relates to goggles and the like and has particular reference to flexible connections for the lenses which serve the same purpose as hinged lenses without the disadvantages of hinges.

The object of the invention is to provide improvements which lend great flexibility to the lense connections and at the same time hold the lenses in their normal relation with substantial rigidity, or with such firmness as is desirable to hold the lenses in their proper relations to the eyes of the user.

Another object is to provide a neat and attractive construction, and a combination of very simple parts which are independent of each other for the purposes of repairs where one part is broken.

With these general objects in view this invention consists of the novel construction, combination and arrangement of parts all as hereinafter described in detail, illustrated in the accompanying drawing and incorporated in the appended claims.

In the drawing—Figure 1 is an elevation of a pair of goggles equipped with the present improvement. Fig. 2 is an enlarged view of the connections, parts of the lenses being broken away. Fig. 3 is a section taken on line 3—3 of Fig. 2. Fig. 4 is a perspective view of the band which supports the springs against angular movement and carries the nose piece. Fig. 5 is a view in elevation of the blank out of which the Fig. 6 fittings, straps or clamps for holding the ends of the connections, are formed. Fig. 6 is a perspective view of one of the fittings.

In the several views 2 and 3 are a pair of ordinary lenses equipped with the usual temples 4 and 5 mounted in any suitable manner. The lenses 2 and 3 are connected for a normally fixed relation to each other and also for relative angular movement by a pair of springs that are substantially identical, one of said springs having a coiled portion 6 and loop-ends 7 and 8 while the other has a coil 9 and loop-ends 10, 11 which are clamped or secured to the lenses by straps or fittings such as shown separately in Fig. 6 as consisting of plates or sides 12 and 13 and a connecting yoke 14 all in one piece bent from the blank shown in Fig. 5. The loops 7, 8, 10 and 11 are held between the wings or plates 13 and the lenses and are fastened by rivets or screws 15 which occupy bores 16 and 17 in the plates 12 and 13 and similar registering holes in the lenses. The spring coils are covered and supported against sagging angularly relative to adjacent edges of the lenses by a band 18 which carries the nose-piece 19 secured to the band by a connecting stem 20. The band 19 may be fitted to normally contact closely with the inner edges of the lenses because when the latter are flexed the coils of the springs expand to the extent necessary for free angular movement within the required range. The jointure, while flexible, is therefore quite firm and for all practical purposes as firm as the usual non-flexible connections or connecting nose-piece, or bridge. While the full size view of Fig. 1 discloses the ends of the springs for the sake of clearness, in practice only the curved sides 12 and 13 of the clips and the neat band 18 are visible, which gives a very pleasing appearance, and for commercial utility purposes this is an important element of construction in articles to be worn on a person so conspicuously as a pair of goggles. The loops 7, 8, 10 and 11 are placed against the inner sides of the lenses.

I claim as my invention—

1. The combination with a pair of goggle lenses, of coiled spring connections for same which connect said lenses against sagging movement relative to each other while permitting relative angular movement of said lenses.

2. The combination with a pair of goggle lenses, of coiled spring connections, and means for clamping the ends of said springs to the respective lenses against pivotal movement of said ends.

3. The combination with a pair of goggle lenses, of connections consisting of coiled springs interposed between adjacent edges of said lenses and provided with loops to be clamped against the faces of said lenses, and clips constructed and arranged to secure said loops to said lenses.

4. The combination with a pair of lenses of expansible connections secured to the lenses against angular movement, and a nose-piece mounted on said connections.

5. The combination with a pair of lenses, of extensible and flexible connections, means securing the ends of said connections to the lenses against movement relative to said lenses, a nose-piece, and means for supporting said nose piece on said connections.

6. The combination with a pair of lenses, of connections for same consisting of spring coils interposed between said lenses and having ends secured to said lenses, and a band substantially concealing said coils.

7. The combination with a pair of lenses of extensible and flexible spring connections secured to said lenses, a band loosely mounted on and incasing said connections between said lenses, and a nose-piece mounted on said band.

8. The combination with a pair of lenses, of a connection consisting of a spring having a coil interposed between said lenses and flat ends lying against the faces of said lenses, means for securing said ends against movement relative to the lenses, and means for supporting said lenses in their proper relations to each other.

9. The combination with a pair of lenses, of a connection for same consisting of a spring having a coil interposed between said lenses and straight ends to overlie the adjacent ends of said lenses, means securing said ends, a nose-piece, and means supporting said nose-piece on said coil.

In testimony whereof I have hereunto set my hand in the presence of two subscribing witnesses.

HERMAN J. BRENNECKE.

Witnesses:
E. J. HAYS,
EDW. E. MILLER.